Aug. 1, 1939.   E. J. HOUDRY ET AL   2,167,655
PROMOTION OF CHEMICAL REACTIONS
Filed Jan. 13, 1936
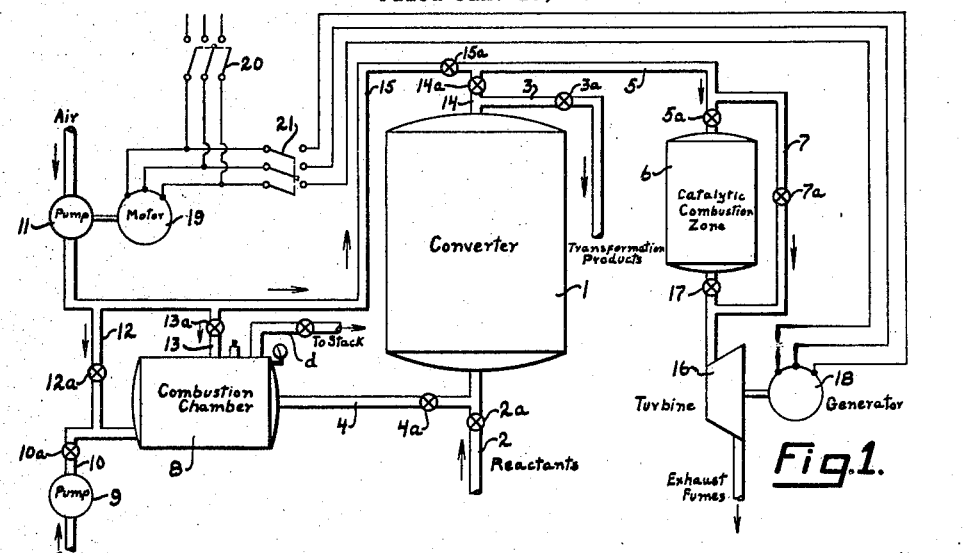
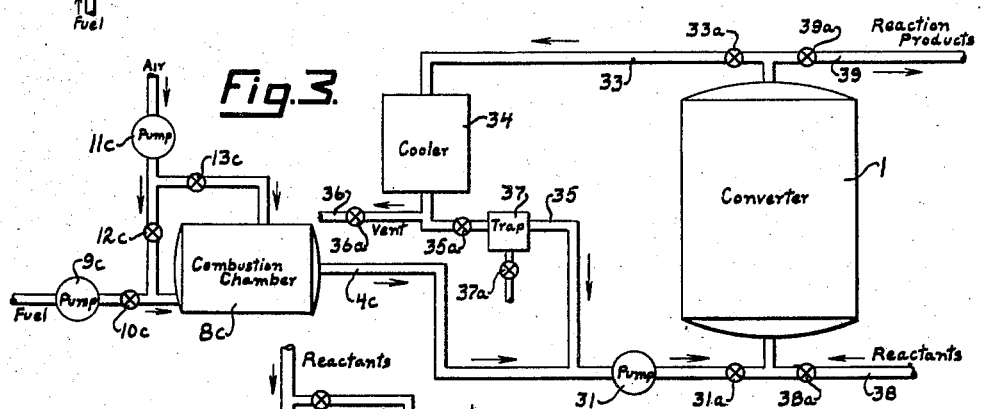
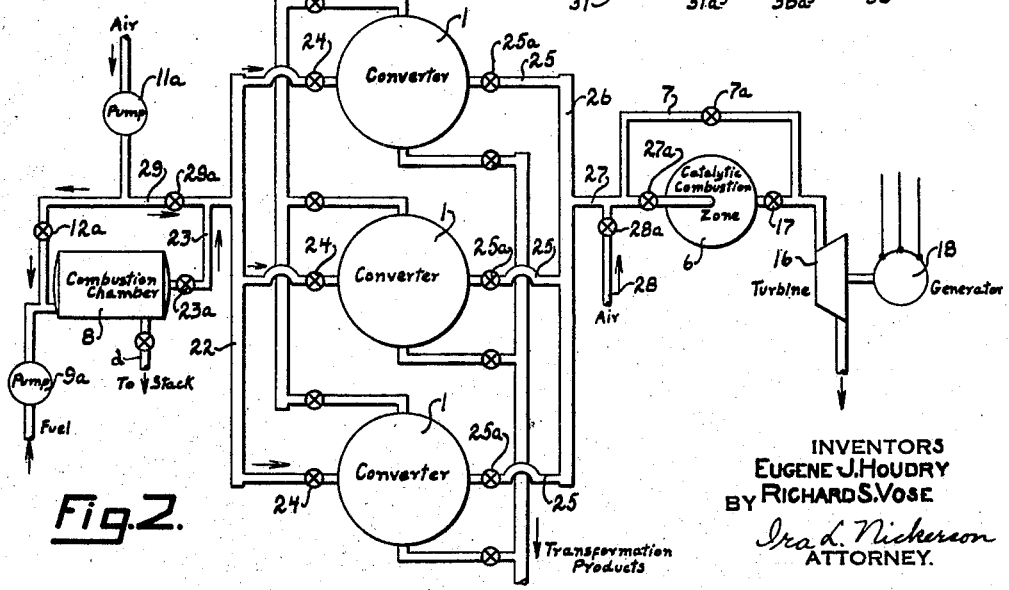
INVENTORS
EUGENE J. HOUDRY
BY RICHARD S. VOSE
Ira L. Nickerson
ATTORNEY.

Patented Aug. 1, 1939

2,167,655

UNITED STATES PATENT OFFICE 2,167,655

PROMOTION OF CHEMICAL REACTIONS

Eugène J. Houdry, Rosemont, and Richard S. Vose, Ridley Park, Pa., assignors, by direct and mesne assignments, to Houdry Process Corporation, Wilmington, Del., a corporation of Delaware Application January 13, 1936, Serial No. 58,858

15 Claims. (Cl. 196—52)

The present invention relates to treating operations, especially fluid treating operations employing contact materials or catalysts enclosed in suitable apparatus and used alternately on-stream and in regeneration. More specifically, it is concerned with the regeneration in situ of beds of such contact masses when utilized to promote, enter into, or in any way assist in chemical reactions, such as the transformation or other treatment of materials including, by way of illustration, hydrocarbons and their derivatives. Hydrocarbons, whether of petroleum, coal, shale or other origin, when subjected, in liquid or vapor phase, to contact with a catalyst or contact mass, to effect transformations such as cracking, reforming or polymerizing for example, produce as a result of the reaction carbonaceous, sulphurous or other burnable deposits which progressively impair the activity of the mass. Such deposits may be removed from the mass by interrupting the transforming, refining or similar or related operation and by passing a regenerating medium, for example of an oxidizing nature, through the bed of contact mass which is maintained within a suitable temperature range. Other materials to be transformed or treated may lay down similar or dissimiliar deposits on the contact mass, depending upon their character, which may likewise be eliminated by passing a regenerating fluid, such as an oxygen-containing gas, therethrough.

Regeneration or restoration of a catalyst to activity is an important part of contact treating operations such as above indicated, and economies and improvements in the regeneration step and in suitable apparatus therefor make up a substantial contribution to the commercial value of the treating operation as a whole.

The importance of supplying the regenerative medium in heated condition and even at a temperature at or above that at which combustion will begin and continue has already been disclosed, as for example in the copending application of E. J. Houdry and T. B. Prickett, Serial No. 24,844 filed June 4, 1935 (Patent No. 2,078,950, issued May 4, 1937). After much experimentation and thorough testing over a considerable period the discovery has been made that, contrary to previous indications, pressure can become an important factor in promoting rapidity and completeness of regeneration. This is particularly true when the contact or catalytic mass is made up of solid and very compact individual pieces which are absorbent as well as adsorbent, such as molded pieces of silicious material or of blends of silica and alumina formed under pressure and cured by prolonged heat treatment. Heretofore it appeared that only an excess of the regenerating medium was needed and that pressure had little or no effect after burning had begun. Now it has been established that relatively smaller amounts of regenerating material when under pressures of the order of three to seven atmospheres or above effect sufficient improvement in the speed and thoroughness of the regeneration to compensate at least in part for the added cost of equipment and expense of operation.

It is an object of this invention to provide certain improvements in the process of regeneration and in apparatus therefor. It is a further object of this invention to provide convenient and economical means and methods of accurately controlling the regeneration and utilizing the energy developed thereby. It is a still further object of this invention to maintain certain desired superatmospheric pressures and temperatures within the bed of contact mass during the regeneration operation and to do so conveniently and economically. Utilization of the energy of the circulated regenerating fluid to provide at least a part of the energy required to carry on the regeneration step is contemplated along with the above specified objects. These and other objects and advantages, as well as a quick understanding of the invention as a whole, will be gained from subsequent description and by reference to the accompanying drawing in which:

Fig. 1 is a diagrammatic view of regeneration circuit, including a converter and means for supplying regeneration fluid thereto and for receiving and utilizing products of regeneration therefrom;

Fig. 2 is generally similar to Fig. 1 but shows in plan view a plurality of converters to indicate how a transforming or refining operation may be made continuous where one converter necessarily must undergo regeneration periodically; and Fig. 3 shows in diagrammatic view a modification of the regeneration circuit shown in Fig. 1.

Referring more in detail to the drawing, in the several figures of which like reference characters denote similar parts, the converter 1 may contain any suitable catalyst or contact mass (not shown) for promoting the desired reaction. For example, in the case of hydrocarbon conversion it may consist wholly or in part of aluminum silicates such as activated hydrosilicates of alumina, and natural or artificial blends of silica and alumina with or without the addition of other active material including metals and metallic compounds, such materials being prepared in molded or other form, for example after the manner disclosed in the copending application of E. J. Houdry, Serial No. 600,581, filed March 23, 1932 (Patent No. 2,078,945, issued May 4, 1937). During the on-stream period reactant fluids may be introduced into the converter through duct 2 controlled by valve 2a and the resulting products may be withdrawn from the converter through duct 3 controlled by valve 3a. At the end of an on-stream period when it is desired to stop the introduction of reactants and to regenerate the contact mass or catalyst, valves 2a and 3a are closed and regeneration fluid is introduced into the converter through duct 4 and valve 4a; while products of regeneration may be withdrawn through duct 5, which communicates with a catalytic combustion chamber 6, through valve 5a. When it is desired to by-pass the catalytic combustion chamber, valve 5a may be closed and fluid will flow through by-pass duct 7 and valve 7a therein.

Regeneration fluid of controlled temperature and oxidizing potential is supplied to the converter 1. While this may be effected in various ways, the method illustrated involves regulating the amount of fuel burned in combustion chamber 8 and the relative portions of air or other oxygen-containing gas on the one hand and flue gas resulting from the combustion on the other. Fuel from any source is introduced by pump 9 through duct 10 and valve 10a into combustion chamber 8, while air or other oxygen-containing gas is forced by pump 11 through duct 12 and valve 12a so as to enter the combustion chamber together with the fuel. Additional air is introduced into admixture with the flue gas through duct 13 and its proportion is regulated by controlling valve 13a. The mixture of air and flue gas then passes through duct 4 into converter 1. The proportion of air to flue gas or, more accurately, the proportion of oxygen to the total gaseous mixture determines the oxidizing potential of the regeneration fluid. The higher the proportion of oxygen to the total regeneration fluid, the higher is the oxidizing potential of the latter. In the case where the converter is used in the transforming of hydrocarbons and contains carbonaceous and other deposits, the regeneration mixture is introduced at such rate and such temperature as to maintain a regenerating temperature of the order of 850° to 1100° F., for example, within the converter 1. The regeneration being an exothermic reaction, the regenerating mixture is often introduced at some temperature below the range preferred within the converter so as to at least in part compensate for the heat generated by the regenerating operation. Additional temperature control may also be effected, if desired, by such known means as indirect heat exchange with an extraneous medium circulated around the reaction chamber or through the chamber by suitable conduits as indicated, for example, in the aforesaid co-pending application, Serial No. 24,844. Gaseous products of regeneration, which normally include substantial proportions of CO, emerge from the converter through duct 14 and valve 14a and pass through the previously mentioned duct 5. When the products of regeneration are to be passed through the catalytic combustion chamber to convert the gaseous CO to $CO_2$, it is often necessary or desirable to add more oxygen to the products of regeneration. This may be accomplished in the proportion desired by controlling valve 15a located in duct 15.

The catalytic combustion chamber 6 contains a suitable catalytic mass (not shown) for effecting conversion or oxidation of CO into $CO_2$, such as a mass comprising or containing metal oxides including those of copper, iron, etc., as disclosed in detail in the copending application of E. J. Houdry, Serial No. 78,542, filed May 8, 1936. The catalytic combustion chamber is followed by suitable apparatus for conserving and utilizing at least a part of the energy of the heat and pressure of the products of combustion, such as a gas turbine 16 to which the combustion chamber is connected by the duct shown controlled by valve 17. A heat exchanger or other means (not shown) for utilizing a portion of the heat energy of the stream of gases may intervene in the circuit between the catlytic combustion zone and the turbine, or between the converter and the turbine. This may be desirable, for example, when the gases leaving the converter are at such a high temperature as to injure the turbine. When the gaseous products of combustion are by-passed around the catalytic combustion chamber, valves 5a and 17 will be closed and valve 7a in an opened position. The turbine 16 may be of any suitable type depending upon velocities and pressures of the particular installation employed. Suitable types for certain conditions are well known to those skilled in the art and are indicated in various hand-books and other literature, such for example, in Mark's Mechanical Engineers' Handbook and many other standard works. The energy of the exhaust fumes or gases from the turbine 16 may be further reduced by passing such gases through any desired heat exchangers or steam generators or the like. They may, for example, be employed to preheat either the fuel or the air which is introduced into combustion chamber 8, and when the regenerating medium is arranged to be admitted to the converter at a relatively low temperature it may be possible to omit the combustion chamber 8 entirely.

Turbine 16 may drive electric generator 18 to supply power for any purpose, for example to the electric motor 19 which drives pump 11. Motor 19 may also drive pump 9 although, for the sake of clarity, this showing is omitted from the drawing.

When the regeneration is being initiated and before products of regeneration are supplied to drive the turbine 16, it is necessary to have power to start pumps 11 and 9. This may be derived for example, from an external source by closing switch 20 and maintaining switch 21 in an opened position. Also, during this starting up period, fluid may be vented from chamber 8 through valved duct d for a short while or until a desired temperature, pressure and ratio of constituents of the regeneration fluid is arrived at; then venting through duct d will be cut off and regeneration fluid passed through duct 4 to the converter. (The term "converter" is used herein and in the appended claims in a generic sense to include various chambers for refining, transforming, purifying or otherwise treating fluids).

There are three definite steps of energy addition to the compressed fluid used for regeneration in the operation above described. First, energy is supplied in combustion chamber 8; secondly, energy is added by the exothermic regeneration in the converter 1; and thirdly, energy is added by the exothermic conversion of CO to $CO_2$ in the catalytic combustion chamber 6. The first major step of energy reduction may take place in the gas turbine 16. Further steps of energy reduction may take place in a preheater, a waste heat boiler, or any desired heat exchanger. However, transfer of energy in a preheater or other heat exchanger may precede the reduction of energy of the gas stream in the turbine.

Various elements of apparatus may replace the gas turbine 16 for example, a heat engine, a compressed air motor or any other suitable type of prime mover may be substituted.

Any suitable pressures of regenerating medium are comprehended. Superatmospheric pressures of various magnitudes, depending upon the ability of the equipment to withstand such pressures at the temperatures employed, are particularly contemplated, for example, substantial superatmospheric pressures up to 150 lbs./sq. in. gauge, pressures of about 40 to 100 lbs./sq. in. gauge and especially gauge pressures of the order of 50 to 80 lbs./sq. in. having been found a practical and useful choice.

The apparatus shown in Fig. 2 is very similar to that shown in Fig. 1 except that a plurality of converters 1 are shown, with the idea in mind that one or more of such converters will be on-stream while the other or others are undergoing regeneration, with the result that a stream of fluid products of regeneration will be continuously supplied or fed to the turbine 16 or to equivalent or additional energy-utilizing apparatus. Instead of combustion chamber 8 being connected directly to the converter 1, it is connected to any suitable manifolding duct 22 through duct 23 controlled by valve 23a. The manifolding duct is in turn connected with each of the converters through suitable leads, each having a valve 24 which may be opened during regeneration and closed while the unit is on-stream. Products of regeneration pass from any one of the converters undergoing regeneration through respective duct 25 controlled by valve 25a into manifolding duct 26, which latter in turn is connected with catalytic combustion chamber 6 through duct controlled by valve 27a. Additional oxygen may be supplied to the gaseous products of regeneration before they enter the catalytic combustion zone through duct 28 controlled by valve 28a. The catalytic combustion chamber may be by-passed through duct 7 controlled by valve 7a, if desired. Gases leaving the catalytic combustion zone, or avoiding the same, pass to gas turbine 16 (with or without precooling) where their energy is reduced by supplying energy of motion to the turbine. The turbine 16 in turn drives generator 18 which supplies power which may be employed for any purpose, for example, to drive pump 11a and/or 9a.

In the apparatus shown in Fig. 2, instead of free oxygen of the regenerating medium being supplied within the combustion chamber 8 it is passed into the stream of flue gases through the duct 29 controlled by valve 29a.

In the apparatus shown in Fig. 3 air and fuel are forced into combustion chamber 8c under any desirable pressure by means of pumps 11c and 9c respectively. The relative proportions of air and fuel may be further controlled by means of valves 12c and 10c. Additional air or oxygen-containing gas for accomplishing the regeneration of the contact mass within converter 1 is supplied to the combustion chamber, following the zone of combustion, through the duct controlled by valve 13c. The air and gaseous products of combustion become admixed and pass together through duct 4c and are forced by pump 31 through valve 31a and into and through the converter 1. The contaminants deposited upon the contact mass (not shown) within the converter 1 are oxidized and the gaseous products of regeneration pass from the converter through duct 33 controlled by valve 33a and may be employed to furnish energy to any apparatus desired, such, for example, as equipment for producing mechanical energy or a heat exchanger such as a preheater, economizer, or the like. Any desired proportion of the products of regeneration (which may be considered as of the character of a flue gas) may be recycled through the converter by suitable control of the valves shown. The products of regeneration, as shown, pass through heat exchanger or cooler 34 and duct 35, controlled by valve 35a, back into duct 4c behind the pump 31. Duct 36, controlled by valve 36a, serves to vent any desired proportion of the products of regeneration from the system. Such vented gases may be employed for any purpose desired and, where the proportion of vented gases is high and their energy content large, the venting duct 36 may precede the cooler 34. Liquid trap 37 serves to remove any liquids or condensates which are carried by the products of regeneration and the same may be removed from the trap by control of the valve 37a.

It will be clear that reactants may be supplied to the converter through duct 38 controlled by valve 38a and reaction products may be withdrawn therefrom through duct 39 controlled by valve 39a, valves 33a and 31a being closed during the on-stream period.

It will be noted that, in the apparatus shown in Figs. 1 and 2, all of the pressure is supplied to fluids preceding their entry into the combustion chamber 8; whereas, in the arrangement shown in Fig. 3, there is a pump or pressure booster between the combustion chamber and the converter. It is also seen that a convenient and efficient process and apparatus for effecting regeneration of a contact mass under superatmospheric pressure and in a controlled manner are provided.

Where herein or in the appended claims the term "substantially superatmospheric pressures", or the like, is employed, it will be understood that pressures are contemplated which are appreciably above those heretofore commonly used to offset the unavoidable pressure drop through a converter or apparatus containing contact material which is under regeneration, and, for example, at least approximately of the order of three atmospheres, as indicated hereinabove.

It will be understood that the showing and description herein made are illustrative only and that all variations of process and apparatus within the scope of the appended claims are contemplated.

What we claim is:

1. In the contact treatment of reactant fluids involving the use of a bed of solid, porous and incombustible contact material which is maintained within a confined reaction zone and is alternately on-stream to effect the desired treatment of reactants and in regeneration in situ, in which the contact material becomes contaminated with combustible deposits during the on-stream period, which are removed therefrom during the period of regeneration, the process of regeneration which comprises feeding a gaseous regenerating mixture containing oxygen and products of combustion under a superatmospheric pressure into said contact material, said superatmospheric pressure being appreciably in excess of that needed to force said regenerating mixture through said contact material and sufficient so that the products of regeneration leaving the aforesaid reaction zone are under a substantial superatmospheric pressure, controlling the proportion of oxygen to products of combustion in said gaseous mixture to control its oxidizing potential and consequently the regeneration temperature within said contact material, permitting the escape of gaseous products of regeneration from said contact material, passing such gaseous products through a combustion zone containing catalyst capable of effecting the formation of $CO_2$ from the CO contained in the gaseous products, further to increase their energy, and utilizing the energy of said gaseous products in the generation of power.

2. In the contact treatment of reactant fluids involving the use of a bed of solid, porous and incombustible contact material alternately on-stream to effect the desired treatment of reactants and in regeneration in situ to restore the contact material to active condition, the contact material becoming contaminated with combustible material formed during the on-stream period for treating said reactants, the process of regeneration and production of an inert medium of high energy content which comprises feeding a gaseous regenerating mixture, containing oxygen and a relatively inert diluent gas, under substantial superatmospheric pressure into said contact material, said superatmospheric pressure being appreciably in excess of that needed for forcing the regenerating medium through the said contact material and at least of the order of three atmospheres, controlling the proportion of oxygen to said inert diluent gas in said gaseous regenerating mixture to control its oxidizing potential, and consequently the regeneration temperature within said contact material, withdrawing products of regeneration from said contact material, said superatmospheric pressure being maintained throughout substantially the entire period of regeneration, and subjecting the withdrawn products of regeneration to an oxidizing operation to convert CO to $CO_2$ and to free said products of other burnable components thereby to produce an inert gas at controlled temperature and of high energy content suitable for industrial use.

3. In the contact treatment of reactant fluids involving the use of a bed of solid, porous and incombustible contact material alternately on-stream to effect the desired treatment or conversion of reactant fluids and in regeneration in situ to restore the said contact material to active condition, the contact material becoming contaminated with combustible deposits during the on-stream period, the process of regeneration and production of an inert medium of high energy content which comprises feeding a gaseous mixture containing oxygen and products of combustion under substantial superatmospheric pressures up to pressures above 40 lbs./sq. in. gauge and of the order of 150 lbs./sq. in. gauge into said contact material, said pressure being sufficiently above atmospheric so that the products of regeneration leaving the said contact material are under a substantial superatmospheric pressure, controlling the proportion of oxygen to said products of combustion in said gaseous mixture to control the oxidizing potential of the latter and consequently the regeneration temperature within said contact material, withdrawing products of regeneration from said contact material while maintaining said superatmospheric pressures throughout substantially the entire period of regeneration, and adding energy to the stream of products of regeneration and at the same time rendering them non-corrosive by oxidizing CO and other burnable components thereof, thereby to provide an inert gas of high energy content suitable for industrial use.

4. In the contact treatment of reactant fluids from the group comprising hydrocarbons and their derivatives involving the use of a bed or mass of solid porous and incombustible contact material maintained within a confined reaction zone and alternately on-stream to effect the desired treatment or transformation of reactants and in regeneration in situ to restore said contact material to active condition, the contact material becoming contaminated with combustible deposits during the on-stream period, the process of regeneration which comprises feeding a gaseous regenerating mixture containing oxygen and relatively inert diluent gas under a superatmospheric pressure into said contact material, said superatmospheric pressure being appreciably in excess of that needed for forcing the gaseous regenerating mixture through said contact material and sufficiently high so that the products of regeneration leaving the contact material are under a substantial superatmospheric pressure, controlling the proportion of oxygen to the aforesaid inert diluent gas in said gaseous mixture to control the oxidizing potential of the latter and consequently the regeneration temperature within said contact material, withdrawing a stream of gaseous products of regeneration from said contact material, increasing the energy content of said stream, utilizing the energy of the stream of gaseous products in the generation of motive power, and employing at least a portion of said motive power to introduce said gaseous regenerating mixture under the aforesaid superatmospheric pressure into said reaction zone.

5. In the use of a solid, porous and incombustible contact material for promoting desired chemical changes in fluid reactants during which a burnable contaminating deposit accumulates on the contact material requiring removal of the deposit by an exothermic oxidizing operation, the process of regeneration and of power recovery therefrom comprising the steps of imposing a superatmospheric pressure on a regenerating medium containing oxygen, sending the compressed medium through two heating zones, the first of which contains the said contact material undergoing regeneration and the other effects oxidation of all burnable components remaining in said medium, said superatmospheric pressure being appreciably higher than that needed to force said regenerating medium through said contact material and sufficient so that the gaseous products of regeneration leave said zones under a substantial superatmospheric pressure and with an increased energy content, and then utilizing the energy of said products of regeneration to generate motive power.

6. In the use of a solid, porous incombustible contact material for promoting chemical transformations of carbonaceous fluid reactants during which a burnable contaminating deposit accumulates on the contact material requiring removal of the deposit by an exothermic oxidizing operation, the process of regeneration comprising the steps of imposing a substantial superatmospheric pressure on the regenerative medium, sending the compressed medium through three heating zones, one of which contains the contact material undergoing regeneration, the pressure maintained upon regenerative medium entering the zone containing said contact material being substantially above atmospheric and at least of the order of three times atmospheric pressure, then utilizing the energy in the resulting medium to produce motive power, and employing at least a portion of said motive power to force said regenerative medium through said zones under the aforementioned superatmospheric pressure.

7. In the contact treatment of reactant fluids from the group comprising hydrocarbons and their derivatives involving the use of a bed or mass of solid, porous and incombustible contact material which is alternately on-stream to effect the desired treatment or transformation of reactants and in regeneration in situ to restore said contact material to useful condition, the mass becoming contaminated with combustible deposits during the on-stream period due to decomposition or transformation of said reactant fluids, the process of regeneration and of energy recovering which comprises burning a fuel at controlled rate to form gaseous products of combustion, mixing an oxygen-containing gas with said products of combustion, controlling the proportion of oxygen to products of combustion in the resulting gaseous mixture, passing said gaseous mixture under a superatmospheric pressure into said contact material, and withdrawing gaseous products of regeneration from said contact material, said superatmospheric pressure being maintained throughout the period of regeneration and being sufficiently high so that said products of regeneration leave said contact material under a pressure of at least three atmospheres, adding energy to said products of regeneration by a catalytic oxidation of burnable components therein including conversion of CO to $CO_2$, and then recovering energy from said products of regeneration in the form of heat, motive power or both.

8. In the transformation of hydrocarbons to form products of different boiling range characteristics and of improved quality by the action of solid adsorptive contact material capable of effecting the desired transformation, said material being alternately on stream to effect the transformation and in regeneration to restore the same to active condition and being disposed in a plurality of reaction chambers for continuous operation of the process, the steps for effecting regeneration quickly and economically which comprise continuously charging an oxygen bearing regenerating medium to the system under superatmospheric pressure at least of the order of three atmospheres to burn contaminants from the contact material in said chambers, continuously withdrawing a stream of regenerating medium from said chambers while still under pressure, increasing the energy of said stream by burning oxidizable material therein including CO in another reaction chamber, and recovering energy from the inert fumes from said last step and utilizing said recovered energy to impose pressure on said regenerating medium.

9. In apparatus for effecting the treatment of reactant fluids, the combination adapted for alternate on-stream operation and regeneration in situ which comprises a converter having a reaction chamber containing an incombustible contact material, means for introducing reactants into said reaction chamber and means for withdrawing products of reaction therefrom, a combustion chamber adapted to supply a regeneration fluid of controlled oxidizing potential to the reaction chamber of said converter, a conduit leading from said combustion chamber to said converter and providing fluid communication between the former and the said reaction chamber of the latter, means for supplying a combustible mixture under substantial superatmospheric pressure to said combustion chamber so that products of combustion under pressure in excess of three atmospheres may form and pass to said converter through the aforesaid conduit, and means after said combustion chamber for introducing an additional quality of oxygen-containing gas under pressure into the aforesaid conduit for admixture with said products of combustion in advance of their entrance into said converter.

10. In apparatus for effecting treatment of reactant fluids from the group comprising hydrocarbons and their derivatives, the combination adapted for alternate on-stream operation and regeneration in situ which comprises a converter having a reaction chamber containing solid incombustible contact material upon which combustible contaminants resulting from transformation of the reactant fluids become deposited during the on-stream operation, means for introducing reactants into said reaction chamber and means for withdrawing products of reaction therefrom, means preceding and connected to said converter for alternately supplying to the reaction chamber thereof a regenerating fluid of controlled oxidizing potential under superatmospheric pressure, means providing a combustion chamber connected to said converter to receive the fumes of regeneration and to oxidize burnable components therein thereby to increase the temperature and energy content of the same, and a prime mover following and joined in fluid communicating relation with said combustion chamber and adapted to be driven by fluid products of regeneration passing from said converter.

11. In apparatus for effecting treatment or transformation of reactant fluids, the combination adapted for operation and regeneration in situ which comprises a converter having a reaction chamber adapted to contain a solid incombustible contact material upon which combustible contaminants may become deposited during the on-stream operation, means preceding and joined in fluid communication with the reaction chamber of said converter for supplying thereto a regenerating fluid of controlled potential under superatmospheric pressure, a catalytic combustion chamber following and joined in fluid communication with the said reaction chamber of said converter and adapted to receive and be fed by fluid products of regeneration passing from said converter and to effect an increased oxidation thereof, and a turbine following and connected to said catalytic combustion chamber and adapted to be driven by the stream of fluid products of regeneration passing from said converter.

12. In apparatus for effecting chemical treatment or transformation of reactant fluids, the combination adapted for operation and regeneration in situ which comprises a converter having a reaction chamber containing a contact material upon which combustible contaminants may become deposited during the on-stream operation or transformation of reactants, means adapted for proportioning the active and relatively inert constituents of a regeneration fluid, and controlling the characteristics thereof, preceding said converter and joined in fluid communicating relation with the reaction chamber thereof, a plurality of ducts preceding and leading to said means, pumps located in at least one of said ducts for sending fluid to said means at any desired pressure, an electric motor for driving at least one of the said pumps, a prime mover following the aforesaid converter and joined in fluid communicating relation with the reaction chamber thereof so as to be driven by fluid products of regeneration passing from said reaction chamber, and an electric generator driven by said prime mover, said electric generator being electrically connected to the aforesaid electric motor so as to supply power to the latter.

13. In apparatus for effecting treatment or transformation of carbonaceous reactant fluids, the combination adapted for operation and regeneration in situ which comprises a plurality of converters each having a reaction chamber containing a solid, porous incombustible contact material upon which combustible contaminants may become deposited during the on-stream operation or transformation of reactants, one of said converters being adapted to be on-stream while another is undergoing regeneration, a manifold, valved ducts leading from said manifold to each of said converters, means preceding and connected to said manifold for supplying a regenerating fluid of desired oxidizing potential and characteristics to said manifold and therethrough to any one of said converters which is undergoing regeneration, a manifold following said converters, a valved duct leading from each of said converters to said last-mentioned manifold to provide fluid communication with the said reaction chamber of each, a catalytic combustion chamber following and joined in fluid connection with said last-mentioned manifold, a gas turbine following and joined in fluid communication with said catalytic combustion chamber, and a valved fluid by-pass around said catalytic combustion chamber so that any desired proportion of fluid fed to said gas turbine may first be passed through said combustion chamber.

14. In apparatus for effecting continuous treatment of carbonaceous fluid reactants, the combination of a series of converters having reaction chambers containing solid, incombustible contact material for effecting the desired reaction and upon which combustible contaminants become deposited during the on-stream operation, said contaminants being removed in an alternate regenerating operation, means for introducing carbonaceous reactants into said reaction chambers and means for withdrawing products of reaction therefrom, means preceding and connected to the reaction chambers of said converters for supplying thereto a regenerating fluid of controlled oxidizing potential under superatmospheric pressure, a catalytic converter connected to said first-named converters for receiving regenerating fumes from the latter and for effecting oxidation of burnable material in said fumes, and a gas turbine following and connected to said last named converter and adapted to be driven by a continuous stream of oxidized fluid products of regeneration so as to recover motive power therefrom.

15. In apparatus for effecting continuous treatment or transformation of reactant fluids, the combination of a series of converters having reaction chambers containing solid incombustible contact material for effecting the desired reaction and upon which combustible contaminants become deposited during the on-stream operation to be removed in a subsequent regenerating operation, means for introducing reactants into said reaction chambers and means for withdrawing products of reaction therefrom during the on-stream period, means preceding and connected to said converters for alternately supplying thereto a regenerating fluid of controlled oxidizing potential under superatmopsheric pressure, and at least one catalytic combustion chamber following and joined in fluid communicating relation with the reaction chambers of said converters and adapted to receive and be fed by fluid products of regeneration passing from said converters, said combustion chamber containing contact material capable of effecting the oxidation of carbon monoxide in said fluid products of regeneration to carbon dioxide, thereby to add energy to the fluid products of regeneration and to render the same non-corrosive so as to facilitate economical recovery of heat and power therefrom, and means connected with said catalytic combustion chamber for receiving the products thereof and for recovering energy therefrom.

EUGÈNE J. HOUDRY.
RICHARD S. VOSE.

CERTIFICATE OF CORRECTION.

Patent No. 2,167,655.　　　　　　　　　　　　　　August 1, 1939.

EUGENE J. HOUDRY, ET AL.

It is hereby certified that error appears in the printed specification of the above numbered patent requiring correction as follows: Page 2, first column, line 30, for the word "portions" read proportions; and second column, line 20, for "catlytic" read catalytic; page 3, first column, line 47, for "duct" read duct 27; page 5, first column, line 26, claim 7, for "recovering" read recovery; page 6, first column, line 22, claim 13, for "soild" read solid; line 39, same claim, for "connection" read communication; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.